United States Patent [19]
Tett

[11] Patent Number: 5,604,788
[45] Date of Patent: Feb. 18, 1997

[54] WIRELESS MESSAGING SYSTEM WITH ELECTRONIC MAIL REPLICATION

[75] Inventor: Richard J. Tett, Plano, Tex.

[73] Assignee: Motorola, Inc., Schaumburg, Ill.

[21] Appl. No.: 405,528

[22] Filed: Mar. 16, 1995

[51] Int. Cl.⁶ .......................... H04M 112/00; H04Q 7/00
[52] U.S. Cl. ................................ 379/58; 379/96; 379/507
[58] Field of Search ................................. 399/96, 56, 57, 399/58, 100; 340/825.44

[56] References Cited

U.S. PATENT DOCUMENTS

| | | | |
|---|---|---|---|
| 4,644,351 | 2/1987 | Zabarsky et al. | 340/852.44 |
| 5,127,047 | 6/1992 | Bell et al. | 379/100 |
| 5,265,033 | 11/1993 | Vajk et al. | 364/514 |
| 5,418,835 | 5/1995 | Frohman et al. | 379/57 |
| 5,479,143 | 12/1995 | Vak et al. | 235/380 |
| 5,479,472 | 12/1995 | Campana, Jr. et al. | 379/58 |
| 5,487,100 | 1/1996 | Kane | 379/57 |

*Primary Examiner*—Curtis Kuntz
*Assistant Examiner*—Lisa M. Coward
*Attorney, Agent, or Firm*—Pablo Meles

[57] ABSTRACT

A wireless messaging system (10) is provided that comprises a wireless message distribution system (12) which receives wireless messages from telephones (14), computer message entry program (16) or telephone-assisted service terminals (18). The wireless messages are sent through a radio frequency transmission (20) to users (22). In addition, the wireless messages are replicated and sent to a wireless message gateway server (24). The wireless message gateway server (24) assembles electronic mail messages including the wireless message and transmits the electronic mail messages to electronic mail networks (26), (28), or (30) such that the user (22) may access his wireless messages through his electronic mailbox within a customer electronic mail system (32).

11 Claims, 2 Drawing Sheets

5,604,788

WIRELESS MESSAGING SYSTEM WITH ELECTRONIC MAIL REPLICATION

TECHNICAL FIELD OF THE INVENTION

This invention relates in general to the field of communications systems and more particularly to a wireless messaging system with electronic mail replication and method of operation.

BACKGROUND OF THE INVENTION

Modern communications systems have opened up a wide range of pathways to allow persons to communicate with one another. The advent of cellular telephones, paging terminals, electronic mail and the like offer persons using these facilities a variety of different methods of communicating with one another. However, very little effort has been made to unite the various facilities. With the advent of so many parallel lines of communication, the time required to monitor the various pathways has also increased. In addition, wireless communication pathways often are limited by their coverage areas. For example, paging networks and cellular networks are limited by the range of the transmitters and line-based communication systems such as electronic mail are only effective when an intended recipient has access to a terminal capable of receiving such communications.

Accordingly, a need has arisen for a system which allows for communications attempted in one communication facility to be replicated into another such that an intended recipient of the message may be alerted of the intended communication no matter which communication facility he checks first.

SUMMARY OF THE INVENTION

In accordance with the teachings of the present invention, a wireless messaging system is provided that substantially eliminates or reduces problems associated with prior systems and methods of operation.

According to one embodiment of the present invention, a wireless message distribution system is provided that receives wireless messages from a plurality of wireless message sources. The wireless message distribution system attempts to send the wireless message through a wireless link to a wireless receiver. The wireless message distribution system also replicates the wireless message and transmits the replicated wireless message to a wireless message gateway server. The wireless message gateway server is operable to access a database of user information and to assemble an electronic mail message responsive to the information retrieved for the particular user. The wireless message gateway server then establishes a link with an electronic mail system and transmits the assembled electronic mail message containing the substance of the wireless message to the electronic mail system.

BRIEF DESCRIPTION OF THE DRAWINGS

A more complete understanding of the teachings of the present invention may be acquired by referring to the accompanying drawings in which like reference numbers indicate like features and wherein.

DETAILED DESCRIPTION OF THE INVENTION

Figure 1:
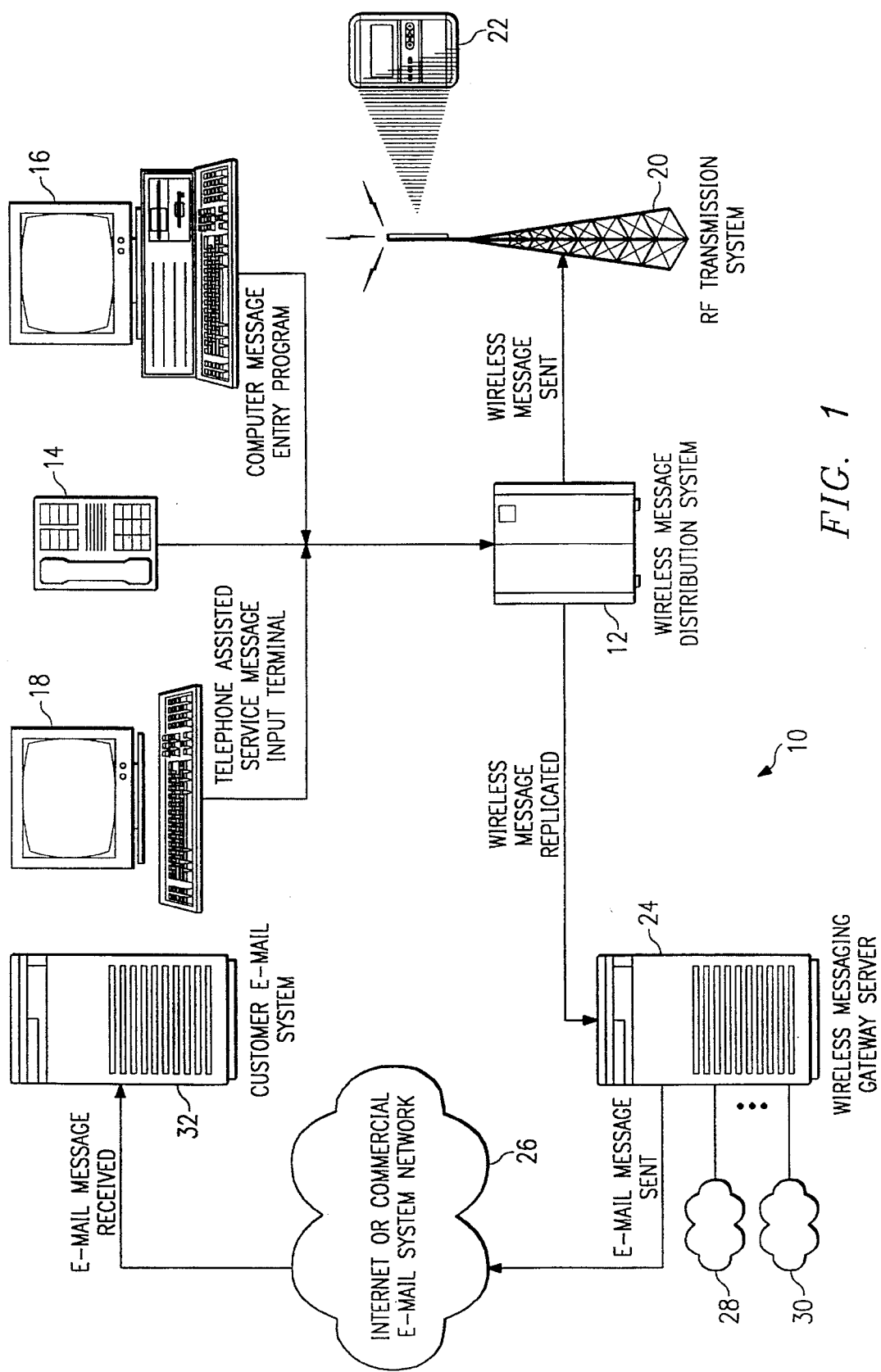
FIG. 1 is a block diagram of the wireless messaging system with electronic mail replication of the present invention.

Referring to FIG. 1, a wireless messaging system indicated generally at 10 constructed according to the teachings of the present invention is illustrated. Messaging system 10 comprises a wireless message distribution system 12 which receives wireless message traffic from a variety of sources. For example, a message sender may use a telephone 14 to input DTMF signals specifying a telephone number that can be sent as a wireless message. Similarly, a computer message entry program running on, for example, a personal computer 16 can be used to input both numeric values and other alphanumeric characters as a wireless message. Similarly, a telephone-assisted service terminal 18 may be used by a service provider to receive calls and to type in wireless messages for input into wireless messages for input into wireless message distribution system 12. The wireless message distribution system 12 is operable to receive messages and to evaluate the destination for the messages as will be described more completely with reference to FIG. 2. The wireless message distribution system 12 is coupled to a radio frequency (RF) distribution system 20 which functions to transmit radio frequency transmissions which are picked up by paging units held by users exemplified by pager 22 shown in FIG. 1. Wireless messaging distribution system 12 may comprise a specialized computer or computers designed to maintain subscriber distribution opertions to accept message data from various communication sources and transmit that message in the appropriate form to radio frequency (RF) distribution system (20) where the message is transmitted to wireless receiver devices.

As will be discussed with reference to FIG. 2, if the pager 22 desires to have wireless messages replicated and transmitted to his electronic mail address, the wireless message distribution system 12 will also transmit the wireless message to a wireless message gateway server 24. The typical destination for a message is one or more coverage where the message will be broadcast by transmitters serving those coverage areas. The transmission of the wireless message from wireless message distribution system 12 to wireless message gateway server 24 is accomplished by defining the wireless message gateway server 24 as an additional message destination for the wireless messaging system 10. Messages intended for the users such as pager 22 who desire the electronic mail replication feature are delivered to the wireless messaging gateway server 24 in addition to the one or more wireless coverage areas. Wireless messaging server 24 may comprise a computer such as a personal computer or mini-computer together with operating system software and messaging switching software. According to one embodiment, wireless messaging server 12 comprises a Hewlett-Packard 9000 mini-computer operating the HP-UX operating system and hosting Worldtalk electronic mail switching software with a gateway module for sending and receiving messages to/from wireless distribution system 16.

The wireless messaging gateway server 24 receives the wireless message and accesses a database of users such as pager 22 who desire the electronic mail replication feature. The wireless messaging gateway server 24 retrieves the information about pager 22 using a user customer code. The information associated with pager 22 includes an electronic mail address associated with that user. If the wireless messaging gateway server 24 is coupled to more than one electronic mail network, the information associated with pager 22 will also specify the particular electronic mail network to be accessed by the wireless messaging gateway server 24. The wireless messaging gateway server 24 then assembles an electronic mail message which includes the electronic mail address for the pager 22. Wireless messaging gateway server 24 then creates an appropriate link with an electronic mail system network such as network 26, 28 or 30 shown in FIG. 1. Networks 26, 28 and 30 may comprise, for example, the Internet network, the MCI electronic mail network or the cc:Mail electronic mail network or other suitable public or private electronic mail networks. In the example shown in FIG. 1, the electronic mail message is transmitted to the network 26 where it is ultimately received by the customer's electronic mail system 32 which is coupled to network 26. At a later time, the customer 22 may retrieve his electronic mail from customer electronic mail system 32. At that time, the pager 22 will view a variety of electronic mail messages from a variety of sources, some of which were initially transmitted as paging messages.

Figure 2:
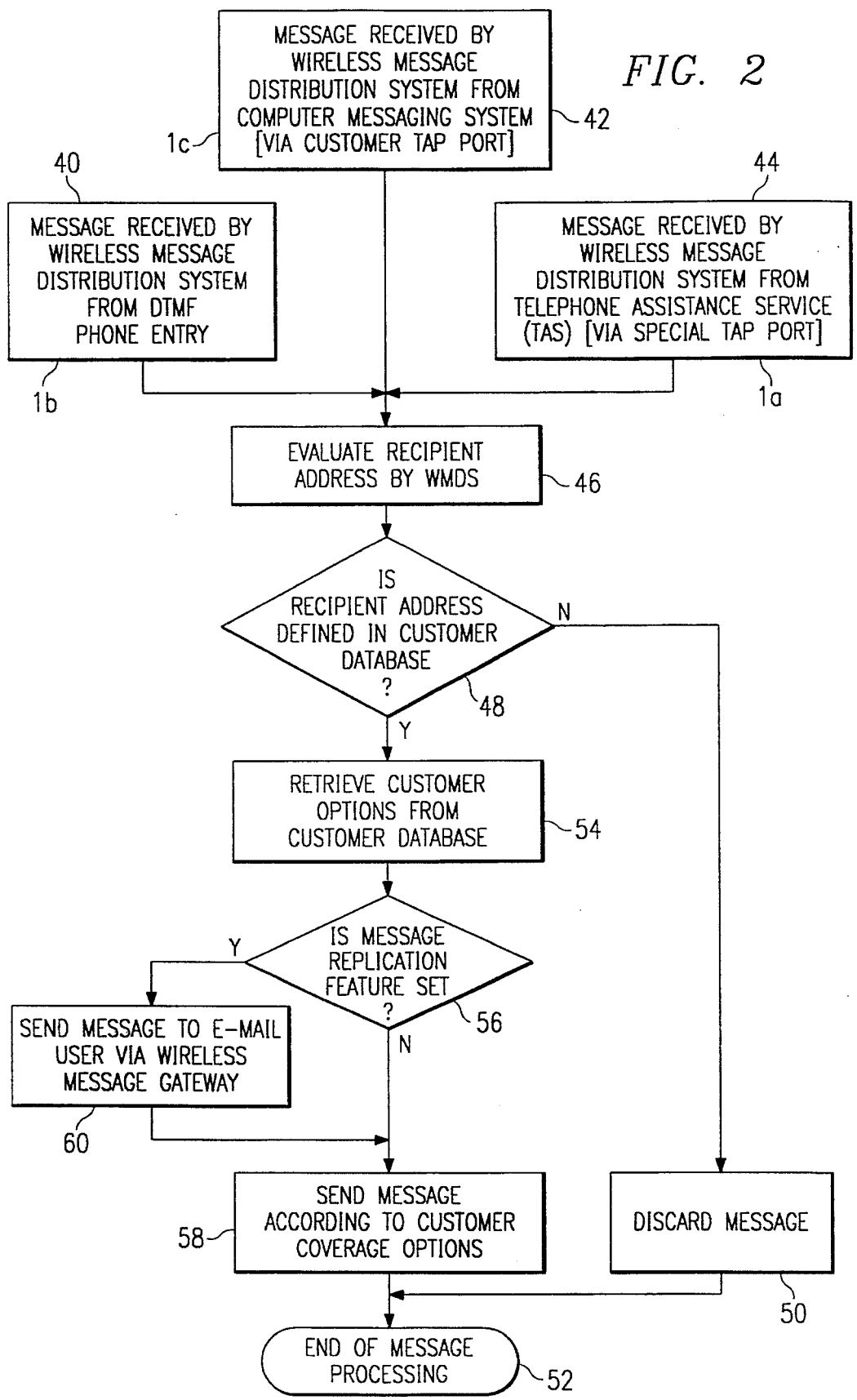
FIG. 2 is a flow chart of the method of electronic mail replication of the present invention.

FIG. 2 is a flow chart of the processing of the electronic mail replication feature of the present invention when used in system 10 illustrated in FIG. 1. Referring to FIG. 2, the method of the present invention begins in either step 40, 42 or 44. At step 40, a message is received by the wireless message distribution system 12 from conventional DTMF telephone entry from a telephone such as telephone 14 shown in FIG. 1. In step 42, a message is received by the wireless message distribution system 12 from a computer messaging system such as the personal computer 16 shown in FIG. 1. Personal computer 16 may run a variety of conventional software systems such as the WinBeep system available from Fourth Wave Software. At step 44, a message is received by the wireless message distribution system 12 from a telephone assistance service such as service 18 shown with reference to FIG. 1. As discussed previously, service 18 essentially comprises a human operator operating a computer program such as WinBeep and receiving telephone calls from message senders desiring to input alphanumeric messages into system 10.

From either step 40, 42 or 44, the method proceeds to step 46 where the wireless message distribution system 12 evaluates the recipient address included in the wireless message received. The method then proceeds to step 48 where a decision is made as to whether or not the intended recipient is defined in the customer database for system 10. If the recipient address is not defined in the customer database, the method proceeds to step 50 where the message is discarded and then to step 52 where processing terminates and the system waits for another message to be received.

If the recipient address was found in the customer database at step 48, the method proceeds to step 54 where the customer options from the customer database are retrieved. The method then proceeds to step 56 where the customer options data is checked to see if the message replication feature is set. If the message replication feature is not set, the method of the present invention proceeds to step 58 where the wireless message is sent according to the conventional customer coverage options through the RF distribution network 20 as described previously. The method then proceeds again to step 52 where the message processing terminates to await another message.

If at step 56, the message replication feature was set in the customer data, the method proceeds to step 60 where the wireless message is sent to the wireless messaging gateway server 24 as discussed previously. The method then proceeds to step 58 where the message is also sent according to the conventional coverage plans. In this manner, the message is sent to the wireless messaging gateway server 24 for replication through the electronic mail pathways discussed previously. In addition, the pager 22 will receive a conventional radio frequency paging message if the pager 22 is within any coverage area associated with network 20.

An important technical advantage of the system and method of the present invention inheres in the fact that the pager 22 is provided with a convenient backup method of receiving his paging messages. For example, if a pager 22 is traveling outside of the coverage area afforded his pager, but the pager 22 is periodically checking an electronic mailbox managed by an electronic mail system such as electronic mail system 32 described with reference to FIG. 1, the user will see his paging messages with the remainder of his electronic mail traffic when he accesses his electronic mailbox within electronic mail system 32.

Although the present invention has been described in detail, it should be understood that various changes, substitutions, alterations and modifications may be made to the teachings described herein without departing from the spirit and scope of the present invention which is solely defined by the appended claims.

What is claimed is:

1. A messaging system comprising:
   a wireless message distribution system operable to receive wireless messages;
   a radio frequency transmission system coupled to the wireless message distribution system and operable to receive wireless messages from the wireless message distribution system and to transmit radio frequency signals to paging units within the transmission range of the transmission system;
   a wireless message gateway server coupled to the wireless message distribution system and operable to receive from the wireless message distribution system copies of wireless messages sent by the wireless message distribution system to the radio frequency transmission system; and
   the wireless messaging gateway server coupled to at least one electronic mail system network, the wireless messaging gateway server operable to assemble an electronic mail message including a portion of one of the copies of the wireless messages and to transmit the assembled electronic mail message to an electronic mail system network such that a user of the messaging system may retrieve messages through the electronic mail system that were originally sent to the wireless message distribution system.

2. The messaging system of claim 1 wherein the wireless messaging gateway server is coupled to a plurality of electronic mail system networks and wherein the wireless messaging gateway server is operable to store and manage a database of user information comprising data specifying at least one electronic mail system network for each user and at least one electronic mail address for each user, the wireless messaging gateway server operable to receive information identifying the user with the copies of the wireless messages and operable to access the database of user information such that the copy of the wireless message is transmitted to the appropriate electronic address within the appropriate electronic mail system associated with the user identified with the particular copy of the wireless message.

3. The messaging system of claim 1 wherein the wireless messaging gateway server is logically defined within the wireless message distribution system to be an additional message destination and wherein the wireless message distribution system includes a database maintained so as to define message destinations for users of the system.

4. The messaging system of claim 1 wherein the electronic mail system network comprises the Internet network.

5. The messaging system of claim 1 wherein the electronic mail system network comprises the MCI Mail electronic mail network.

6. The messaging system of claim 1 wherein the electronic mail system network comprises the cc:Mail electronic mail network.

7. The messaging system of claim 1 wherein the wireless message distribution system is operable to receive wireless messages from DTMF signals received from telephones.

8. The messaging system of claim 1 wherein the wireless message distribution system is operable to receive alphanumeric messages from computers coupled to the wireless message distribution system.

9. A messaging system comprising:

a wireless message distribution system operable to receive wireless messages;

a radio frequency transmission system coupled to the wireless message distribution system and operable to receive wireless messages from the wireless message distribution system and to transmit radio frequency signals to paging units within the transmission range of the transmission system;

a wireless message gateway server coupled to the wireless message distribution system and operable to receive from the wireless message distribution system copies of wireless messages sent by the wireless message distribution system to the radio frequency transmission system;

the wireless messaging gateway server coupled to an electronic mail system network, the wireless messaging gateway server operable to assemble an electronic mail message including a portion of one of the copies of the wireless messages and to transmit the assembled electronic mail message to an electronic mail system network such that a user of the messaging system may retrieve messages through the electronic mail system that were originally sent to the wireless message distribution system;

the wireless messaging gateway server operable to store and manage a database of user information comprising data specifying an electronic mail system network for each user and at least one electronic mail address for each user, the wireless messaging gateway server operable to receive information identifying the user with the copies of the wireless messages and operable to access the database of user information such that the copy of the wireless message is transmitted to the appropriate electronic address within the appropriate electronic mail system associated with the user identified with the particular copy of the wireless message; and the wireless messaging gateway server logically defined within the wireless message distribution system to be an additional message destination and wherein the wireless message distribution system includes a database maintained so as to define message destinations for users of the system.

10. A method of processing wireless messages comprising the steps of:

receiving a wireless message using a wireless message distribution system;

transmitting the wireless message to a wireless message transmission system;

transmitting a radio frequency transmission from the wireless message transmission system to paging units held by users of the system;

transmitting a copy of the wireless message to a wireless messaging gateway server coupled to the wireless message distribution system;

accessing a database stored in the wireless messaging gateway server to retrieve an electronic mail address associated with a user identified in the copy of the wireless message received from the wireless message distribution system;

assembling an electronic mail message including a portion of the copy of the wireless message received from the wireless message distribution system;

transmitting the electronic mail message assembled to an electronic mail system network such that a user may retrieve messages transmitted initially as wireless messages using a customer electronic mail system coupled to the electronic mail system network.

11. The method of claim 10 and further comprising the steps of:

accessing the user database to determine which of a number of electronic mail system networks is associated with the user associated with the copy of the wireless message received from the wireless message distribution system; and selectively forming a communication link between the wireless messaging gateway server and the appropriate electronic mail system network identified in the database of user information for the particular user.

\* \* \* \* \*